US007412142B2

United States Patent
Chen et al.

(10) Patent No.: US 7,412,142 B2
(45) Date of Patent: Aug. 12, 2008

(54) OPTICAL FIBER WITH PLURALITY OF AIR HOLES AND STRESS RODS

(75) Inventors: Xin Chen, Corning, NY (US); Joohyun Koh, Painted Post, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/437,897

(22) Filed: May 19, 2006

(65) Prior Publication Data

US 2007/0269175 A1    Nov. 22, 2007

(51) Int. Cl.
*G02B 6/00* (2006.01)
*G02B 6/02* (2006.01)
*G02B 6/028* (2006.01)
*G02B 6/32* (2006.01)
*G02B 6/36* (2006.01)

(52) U.S. Cl. .................. 385/125; 385/123; 385/124; 385/126; 385/127; 385/128; 385/141; 385/142; 385/143; 385/144; 385/145

(58) Field of Classification Search ......... 385/123–128, 385/141–145
See application file for complete search history.

(56) References Cited

U.S. PATENT DOCUMENTS

| 4,978,377 | A | * | 12/1990 | Brehm et al. .................. 65/403 |
| 5,152,818 | A | * | 10/1992 | Berkey et al. ................. 65/412 |
| 5,841,131 | A | * | 11/1998 | Schroeder et al. ...... 250/227.17 |
| 2005/0094954 | A1 | * | 5/2005 | Pickrell et al. ............... 385/123 |
| 2006/0083471 | A1 | * | 4/2006 | Berkey et al. ............... 385/125 |
| 2006/0088261 | A1 | * | 4/2006 | Berkey et al. ............... 385/123 |
| 2006/0120677 | A1 | * | 6/2006 | Broeng et al. ............... 385/125 |
| 2006/0204195 | A1 | * | 9/2006 | Kurosawa et al. ........... 385/125 |

OTHER PUBLICATIONS

"Polarization-Maintaining Fibers and Their Applications"; Journal of Lightwave Technologies, vol. Lt-4, No. 8, Aug. 1986; Juichi Noda, Katsunari Okamoto and Yutakara Sasaki.
"Birefringence Caused by Thermal Stress in Elliptically Deformed Core Optical Fibers", IEEE Journal of Quantum Electronics, vol. QE-18, No. 11, Nov. 1982; Jun-Ichi Sakai and Tatsuya Kimura.

* cited by examiner

*Primary Examiner*—Frank G Font
*Assistant Examiner*—Jerry Blevins
(74) *Attorney, Agent, or Firm*—Svetlana Z. Short

(57) ABSTRACT

An optical fiber comprising: (i) a silica based passive core having a first index of refraction $n_1$; (ii) a silica based cladding surrounding the core and having a second index of refraction $n_2$, such that $n_1 > n_2$, said cladding having at least one stress rod and at least one air hole extending longitudinally through the length of said optical fiber; and (iii) wherein said optical fiber supports a single polarization mode or poses polarization maintaining properties within the operating wavelength range.

19 Claims, 8 Drawing Sheets

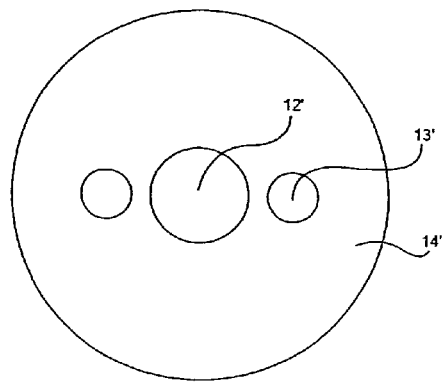
FIG. 1
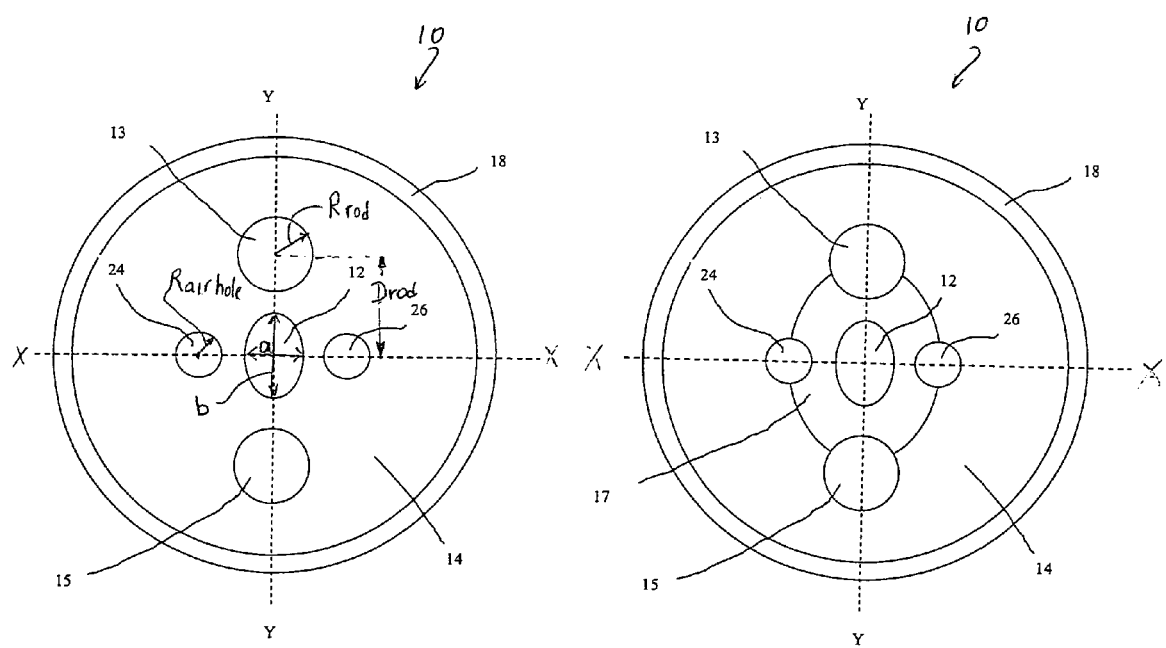
Figure 2A
Figure 2B

OPTICAL FIBER WITH PLURALITY OF AIR HOLES AND STRESS RODS

BACKGROUND OF THE INVENTION

1. Field of the Invention

The present invention relates generally to optical waveguide fibers, and more particularly to optical fibers exhibiting single polarization properties and high birefringence.

2. Technical Background

Background of the Invention

The present invention relates generally to polarization maintaining and single polarization optical fibers that include a plurality of rods and a plurality of air holes in the cladding area.

Optical fiber has become a favorite medium for telecommunications due to its high capacity and immunity to electrical noise. Polarization maintaining fibers and single polarization fibers have been widely used to produce linear polarized output in optical systems. These fibers are useful for ultra-high speed transmission systems and are also utilized as couplers fiber for use with, and connection to, optical components (e.g., lasers, EDFAs, optical instruments, interferometric sensors, and gyroscopes). The single polarization fibers and polarization maintaining fibers can either be active, which means that they are rare earth doped in the fiber core, or passive, which means no rare earth dopants are involved. The polarization characteristic (single polarization) propagates one, and only one, of two orthogonally polarized polarizations within a single polarization band while suppressing the other polarization by dramatically increasing its transmission loss.

Polarization retaining fibers (sometimes referred to as a polarization maintaining fibers) can maintain the input polarizations on two generally-orthogonal axes. These fibers are not single polarization fibers. A common polarization maintaining fiber includes stress birefringence members and includes, as shown in FIG. 1, a circular core 12' surrounded by an cladding region 14'. Core 12' and the cladding region 14' are formed of conventional materials employed in the formation of optical waveguides. The refractive index of the core material is greater than that of the cladding material.

In FIG. 1, diametrically opposed relative to core 12', are two stress-inducing regions 13' formed of a glass material having a Thermal Coefficient of Expansion (TCE) different from that of cladding material 14'. When such a fiber is drawn, the longitudinally-extending stress-inducing regions 13' and the cladding region will shrink different amounts, whereby regions 13' will be put into a state of tension or compression strain. Strain induced birefringence (otherwise referred to a stress-induced birefringence) is imparted in the fiber and thereby reduces coupling between the two orthogonally polarized fundamental modes. It should be recognized that such fibers including these stress-inducing regions 13' do not provide single polarization properties.

Single polarization fibers with a plurality of airholes are also known, however such fibers have a high relative refractive index core delta which makes it difficult to achieve large mode field diameter. It has, therefore, been an area of ongoing development to obtain an optical fiber that will have single polarization performance and has a large mode field area.

Another ongoing development is to obtain an optical fiber that will operate with single polarization with sufficiently large operating bandwidth. This will make it possible for such fibers to be used in wider range of applications which require wider range of wavelength operating window and it will also make the deployment of such fibers to a specific application easier as one fiber can fit the need for applications with quite different operating wavelengths. Another desired feature is to have a single polarization fiber with a large mode area that is comparable or larger than conventional fibers such as Panda type polarization maintaining fibers. However, in order to achieve wide single polarization bandwidth (by using only a plurality of airholes), high fiber core delta is required to generate large enough index contrast for high birefringence. Therefore, to maintaining single mode operation, the fiber core must be sufficiently small, which limits the use of single polarization fibers for some application, such as high power fiber laser or pigtail in modulator, due to small mode field diameter.

SUMMARY OF THE INVENTION

Definitions:

The following definitions and terminology are commonly used in the art.

Refractive index profile—the refractive index profile is the relationship between the refractive index ($\Delta$%) and the optical fiber radius (as measured from the centerline of the optical fiber) over a selected portion of the fiber.

Birefringence—birefringence is the difference between the effective refractive indices of the two polarization modes.

Radii—the radii of the segments of the fiber are generally defined in terms of points where the index of refraction of the material used takes on a different composition. For example, the central core has an inner radius of zero because the first point of the segment is on the centerline. The outer radius of the central core segment is the radius drawn from the waveguide centerline to the last point of the refractive index of the central core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the central core would have an outer radii located at the interface between the annular segment and the cladding.

Relative refractive index percent $\Delta$%—the term $\Delta$% represents a relative measure of refractive index defined by the equation:

$$\Delta\% = 100 \times (n_i^2 - n_c^2)/2n_i^2$$

where $\Delta$% is the maximum refractive index of the index profile segment denoted as i, and $n_c$, the reference refractive index, is taken to be the refractive index of the cladding layer. Every point in the segment has an associated relative index measured relative to the cladding.

According to the present invention the optical fiber includes:

(i). a silica based passive core having a first index of refraction $n_1$;

(ii). a silica based cladding surrounding the core and having a second index of refraction $n_2$, such that $n_1 > n_2$, said cladding having at least one stress rods and at least one air hole extending longitudinally through the length of said optical fiber;

(iii) wherein said optical fiber supports a single polarization mode or poses polarization maintaining properties within the operating wavelength range.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

BRIEF DESCRIPTION OF THE DRAWINGS

FIG. 1 is a schematic cross-sectional view of a prior art optical fiber;

FIG. 2A is the schematic of the cross-sectional view of an embodiment of the optical fiber containing the dual air hole with stress rods.

FIG. 2B is the schematic of the cross-sectional view of another embodiment of the optical fiber containing the dual air hole with stress rods and also moat structure.

DETAILED DESCRIPTION OF THE EMBODIMENTS

Figure 3:
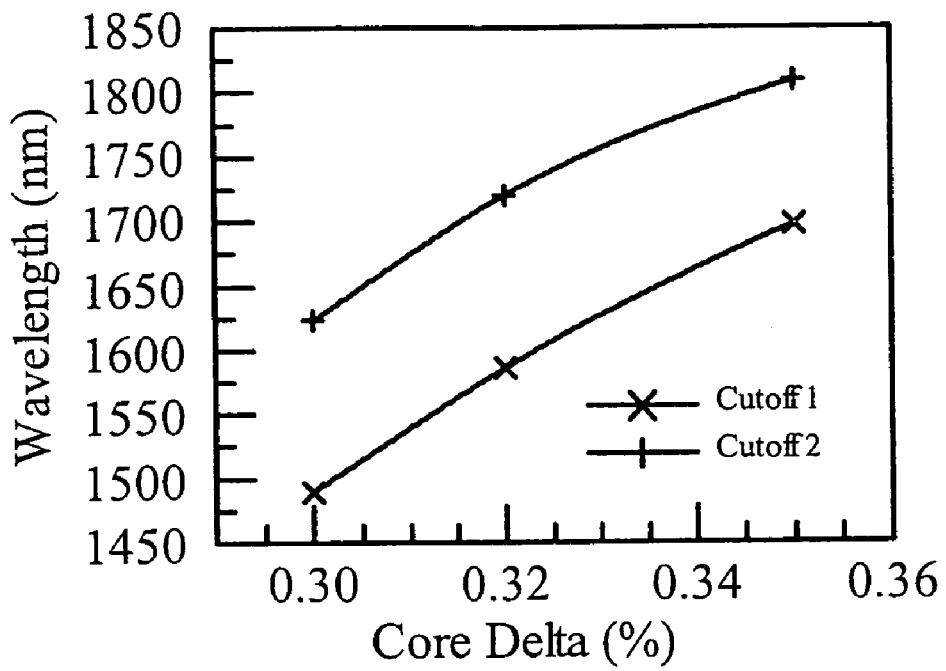
FIG. 3 shows the dependence of the cutoff wavelength of two fundamental polarization modes on the fiber core delta.

In single polarization fibers that use only air holes, the air holes play both the roles of inducing high birefringence and controlling the fundamental mode cutoff wavelength of fiber so that the single polarization wavelength operating window is located at a desired wavelength range. By introducing additional stress members, the roles of inducing high birefringence and of controlling fundamental mode cutoff can be somehow separated, i.e., the stress rods are used to create tress birefringence and the air holes are used to control the cutoff wavelengths. Because the stress birefringence does not depend on core delta very much, low core delta can be used. The advantage is to have a single polarization fiber with larger mode field and larger single polarization operating window.

Reference will now be made in detail to the present preferred embodiments of the invention, examples of which are illustrated in the accompanying drawings. Whenever possible, the same reference numbers will be used throughout the drawings to refer to the same or like parts Two embodiments of single polarization optical fiber in accordance with the present invention are shown schematically in FIGS. 2A and 2B, and are designated generally throughout by the reference number 10. The optical fiber 10 illustrated in FIG. 2A includes: silica based core 12 having a first index of refraction $n_1$; a silica based cladding 14 surrounding the core 12 and having a second index of refraction $n_2$, such that $n_1 > n_2$. The cladding 14 contains at least two stress applying parts, for example stress rods 13 and 15 located on diametrically opposite sides of the core 12 along the line Y-Y. The stress applying parts have a thermal expansion coefficient that is different from that of the inner cladding. The stress applying parts create stress birefringence. The refractive index of the stress applying parts is $n_3$. Preferably $n_3 \leq n_2$ to avoid forming a waveguide in the stress applying parts (stress rods themselves). The stress rods advantageously improve birefringence of the optical fiber 10 and reduce the need for the high core refractive index delta, which facilitates large mode field area and enables the fiber core radius to be larger than 3 µm. The cladding 14 also contains at least two air holes 24, 26, preferably situated on diametrically opposite sides of the core 12 and extending along the core 12, through the length of the fiber 10. The air holes 24, 26 lower the effective refractive index of the inner cladding 14 along the line X-X that is preferably perpendicular to the line Y-Y of the stress applying parts illustrated in FIG. 2A. The air holes have two functions. First, the air holes create form birefringence, which adds to the stress birefringence, so as to enable a larger total birefringence. Second, the air holes can be utilized to cut off one polarization mode, which makes a single polarization fiber. The core 12 and the cladding 14 are made of glass. A protective coating 18 surrounds the cladding 14. The outer coating 18 may be, for example, an organic coating which typically includes a softer primary coating and a harder secondary coating applied over the primary coating. FIG. 2B illustrates an embodiment of optical single polarization fiber 10 with an additional moat structure 17. The moat's refractive index nm satisfies the requirement $n_m < n_2 < n_1$. The additional moat structure 17 lowers the fundamental mode cutoff wavelength, alters the chromatic dispersion value of the fiber, and increases the total birefringence of the fiber. The moat 17 can either take the circular shape or it can be elongated such as in elliptical shape.

In the preferred embodiments, the relative refractive index delta of the core 12 with respect to the cladding 14 is between 0.1% and 2%, more preferable between 0.2% and 1.0%, even more preferably below 0.7% or below 0.5% and most preferably between 0.3% and 0.5% . The radius $r_1$ of the core 12 is in the range of 1-10 µm, more preferably in the range of 2.5-8 µm. For example, 3.8 µm, 4 µm 4.3 µm, 4.5 µm, or 5 µm. The radius of the cladding 14 is between 40 µm to 100 µm, with the preferred values to be around 40 or 62.5 microns. The core 12 is doped with an index raising material. Preferably, the index raising dopant is $GeO_2$. In this embodiment, the cladding 14 is typically pure silica. The two stress applying parts 13 and 15, which have a thermal expansion coefficient that is different from that of the pure silica or $GeO_2$ doped silica, are preferably doped with material $B_2O_3$, or $P_2O_5$ or their combinations. Preferably stress rod delta (relative to pure silica) is −0.8% to −0.1%, for example −0.75%, −0.7%, −0.8%, −0.5%, −0.4% or −0.3%. The stress applying parts create stress birefringence through elasto-optic effects in the core region. The radius of the stress applying part (or stress rod) 13 and 15 is between 4 to 50 μm, preferably 5 to 25 μm, for example 10 μm, 15 μm or 20 μm. The stress rods 13, 15 are located outside of the fiber core 12. The two air holes have a refractive index of 1.0. The air hole radius is between 2 to 30 μm, preferably between 2 μm and 15 μm and more preferably between 5 μm and 10 μm. The air holes 24 and 26 are preferably adjacent to the core 12.

According to the two embodiments, the fiber core 12 includes, in weight percent:

Ge 0.1 to 15 wt %;

It is preferable that the cladding 14 to be made of pure silica.

It is preferable that the stress applying parts 13, 15 contain Boron. The preferred ranges for Boron dopants in the stress rods, in weight percent, are:

B 5 to 30 wt %

It is preferable that moat region is doped with Fluorine. The preferred ranges for Fluorine dopant in the moat region, in weight percent, is:

F 0-3 wt %

The key parameters used to specify the fiber configuration include geometry parameters and the doping levels for the core 12 and the stress rods 13, 15. The fiber core 12 can either be round or elliptical. When it is round, it is specified by the core radius $R_{core}$. When the core is elliptical, it is described by the semi-minor axis length 'a' in the x-direction and semi-major axis length 'b' in the y-direction. The location and the dimension of the stress rod are specified by the distance $D_{rod}$ (which is the distance from the center of the stress rod 13, 15 to the center of the fiber core 12), and stress rod radius $R_{rod}$. The radius of the air hole is $R_{airhole}$. The refractive index of each part of the fiber is specified by the delta relative to the cladding, which is typically formed by the pure silica. For the optical fiber 10 of FIG. 2A there are two delta values to be specified, which are delta of the core $\Delta_{core}$, and delta of the stress rod, $\Delta_{rod}$.

Fiber properties are predicted by numerical modeling. All the numerical modeling was conducted by using Finite Element Method (FEM) involving structural mechanics taking into account the thermal expansion effects, and electromagnetics. It is assumed that during the fiber making process the fiber is cooled down from a high temperature, for example from 1000° C. into room temperature (around 20° C.). The difference of thermal expansion among different part of the fiber due to the material property difference causes stress in the fiber especially in the core of the fiber. Such stress induces anisotropic refractive index changes and results in birefringence. In the second step of the numerical modeling, the stress induces refractive index changes is superimposed with the refractive index due to the use of different dopant and dopant level at different part of the fiber, and effective index of the waveguide taking into account of the stress induced index changes is calculated for both polarization modes of the fundamental mode.

The CTE data for $GeO_2$ doped silica or $B_2O_3$ doped silica is obtained from the paper by Jun-Ichi Sakai, and Tatsuya Kimura, "Birefringence Caused by Thermal Stress in Elliptically Deformed Core Optical Fibers", IEEE J. Quantum Electronics QE-18 (11) 1899-1909 (1982). The differential thermal expansion coefficient (CTE) per unit molar percent is given by $6.5 \times 10^{31\ 8}$ and $9.5 \times 10^{-8}$ respectively for germanosilicate and borosilicae. The relative index difference Δ (in the unit of percent) introduced by unit molar percent is approximated by 0.09 and −0.036 percent respectively for $GeO_2$—$SiO_2$, and $B_2O_3$—$SiO_2$. Therefore, the relation between the CTE and index Δ for $GeO_2$—$SiO_2$, and $B_2O_3$—$SiO_2$ are, $$\alpha_{GeO2}(\Delta) = 5.4 \times 10^{-7} + 7.222 \times 10^{-7} \Delta \quad (1)$$

$$\alpha_{B2O3}(\Delta) = 5.4 \times 10^{-7} - 2.639 \times 10^{-6} \Delta \quad (2)$$

Note that the CTE is in the unit of 1/° C.

The fiber structure can be used to design fibers with large birefringence, or with large single polarization window. The table below (Table 1) shows seven exemplary fiber embodiments (A-G) with different fibers parameters. For all the seven examples, the cladding 14 is doped with 4.88 mol % $GeO_2$, which corresponds to an index delta of 0.52%. The stress rods 13, 15 are doped with 20.8% $B_2O_3$. The stress rod radius and location are selected according to the fiber radius and the core radius to give maximum stress birefringence.

TABLE 1

|  | Example | | | | | | |
| --- | --- | --- | --- | --- | --- | --- | --- |
|  | A | B | C | D | E | F | G |
| Core delta relative to inner clad (%) | 0.2 | 0.2 | 0.17 | 0.1 | 0.1 | 0.1 | 0.06 |
| Core radius (μm) | 4.2 | 4.2 | 4.2 | 5 | 12.5 | 25 | 9 |
| Fiber radius (μm) | 62.5 | 62.5 | 62.5 | 125 | 125 | 250 | 125 |
| Stress rod center (μm) r4c | 22.2 | 22.2 | 22.2 | 34.5 | 43.5 | 81 | 47 |
| Stress rod radius (μm) | 13 | 13 | 13 | 24.5 | 26 | 51 | 26 |
| $GeO_2$ level in cladding 14 (mol %) | 4.88 | 4.88 | 4.88 | 4.88 | 4.88 | 4.88 | 4.88 |
| $GeO_2$ level in stress rods 13 &, 15 (mol %) | 0 | 4.88 | 4.88 | 4.88 | 4.88 | 4.88 | 0 |
| $B_2O_3$ level in stress rods 13 &, 15 (mol %) | 20.8 | 20.8 | 20.8 | 20.8 | 20.8 | 20.8 | 15.6 |
| Air hole radius (μm) | 5 | 5 | 6 | 10 | 12.5 | 25 | 20 |
| Birefringence at 1060 nm ($\times 10^4$) | 3.2 | 3.8 | n/a | n/a | 1.25 | 2.5 | n/a |

TABLE 1-continued

| | Example | | | | | | |
|---|---|---|---|---|---|---|---|
| | A | B | C | D | E | F | G |
| Wavelength Cutoff 1 (nm) | | | 1015 | 880 | | | 916 |
| Wavelength Cutoff 2 (nm) | | | 1165 | 1205 | | | 1143 |

We have also performed extensive modeling of optical fibers 10, by varying different fiber parameters. From the modeling, we learned how the fiber properties depend on different parameters. By fixing other parameters and varying one parameter at a time, we can obtain the dependence of the fiber properties on a particular parameter.

Let us look at one example according to the embodiment in FIG. 2A and determine the birefringence contribution from the stress rods and the dual air hole separately. In this exemplary embodiment, the $R_{core}$ is 4.2 µm (assuming round core), $R_{rod}$ is 15 µm. $D_{rod}$ is 25 µm. $R_{airhole}$ is 6 µm. The refractive index deltas are: $\Delta_{core}$=0.35%, $\Delta_{rod}$=−0.75%. With the presence of both the stress rods and dual air holes, the total birefringence of the optical fiber 10 of FIG. 2A is 5.34×10$^{-4}$. We then modeled a fiber with the same structure, but without the dual air holes, the total birefringence (as contributed from the stress rods 13, 15) is 4.31×10$^{-4}$. We also calculated the fiber birefringence by taking out the stress rods while keeping the dual air holes 24, 26, this fiber's birefringence was 1.12×10$^{-4}$. The sum of the later two situations is approximately equal to the total birefringence of the fiber 10 of FIG. 2A (i.e., fiber that has both dual air holes 24, 26 and stress rods 13, 15). It is clear that by putting both the stress rods and dual air holes into the optical fiber of FIGS. 2A, 2B, the birefringence contributed from both structures is added constructively ending up with higher birefringence. This is the key feature we rely on to make improved PM fiber or single polarization fibers with wider bandwidth.

Figure 4:
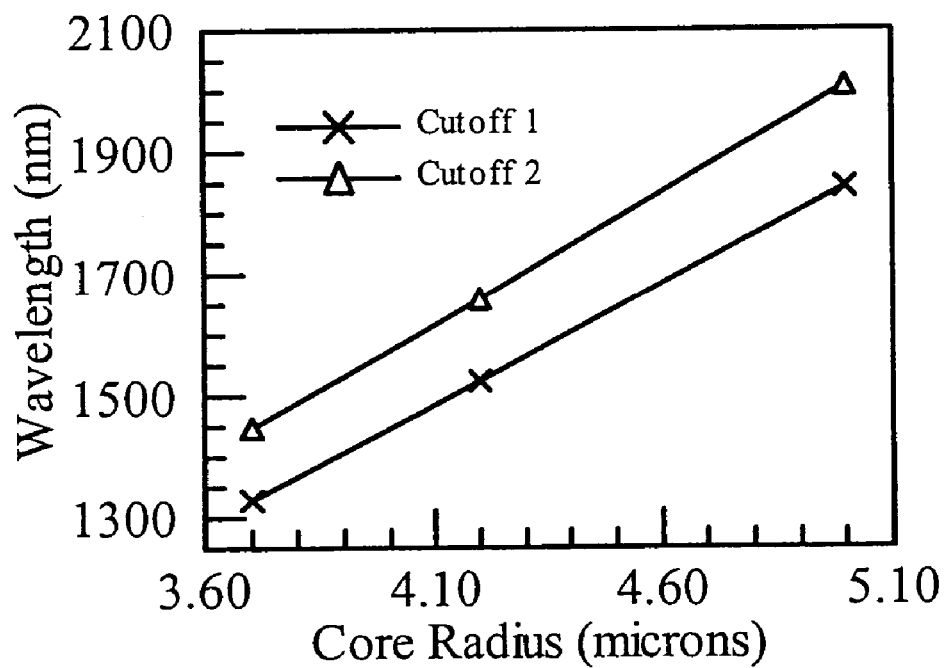
FIG. 4 illustrates the cutoff wavelength of both fundamental polarization modes as a function of the core radius for the optical fiber in the FIG. 2A.

Now, we look at the dependence of the fiber properties on the fiber core parameters. We locked all other fiber parameters except the fiber core delta $\Delta_{core}$, which we varied. FIG. 3 depicts the dependence of the cutoff wavelengths of both polarization modes on the core delta. The constant (i.e., fixed parameters) were: $\Delta_{B2O3}$=−0.75%, $R_{core}$=4.2 µm, $R_{rod}$=15 µm, $D_{rod}$=25 µm, $R_{airhole}$=6 µm, and fiber outer diameter (OD) is 125 µm. FIG. 3 illustrates that the higher the core delta, the higher the fundamental mode cutoff wavelength for both polarization modes. We then looked at the dependence of the cutoff wavelengths on core radius. The constant (i.e., fixed) fiber parameters were: $\Delta_{core}$=0.35%, $\Delta_{B2O3}$=−0.75%, the fiber outer diameter (OD)=125 µm, $R_{rod}$=15 µm, $D_{rod}$=25 µm, and $R_{airhole}$=6 µm. The results are shown in FIG. 4. This figure illustrates that the cutoff wavelength of both polarization modes is sensitive to changes in the core radius. For all the fiber examples in FIG. 3 and FIG. 4, the total fiber birefringence at the wavelength of 1550 nm (when the fiber is not in the single polarization operating regime) is around 4.0×10$^{-4}$ to 5.0×10$^{-4}$.

Figure 5A:
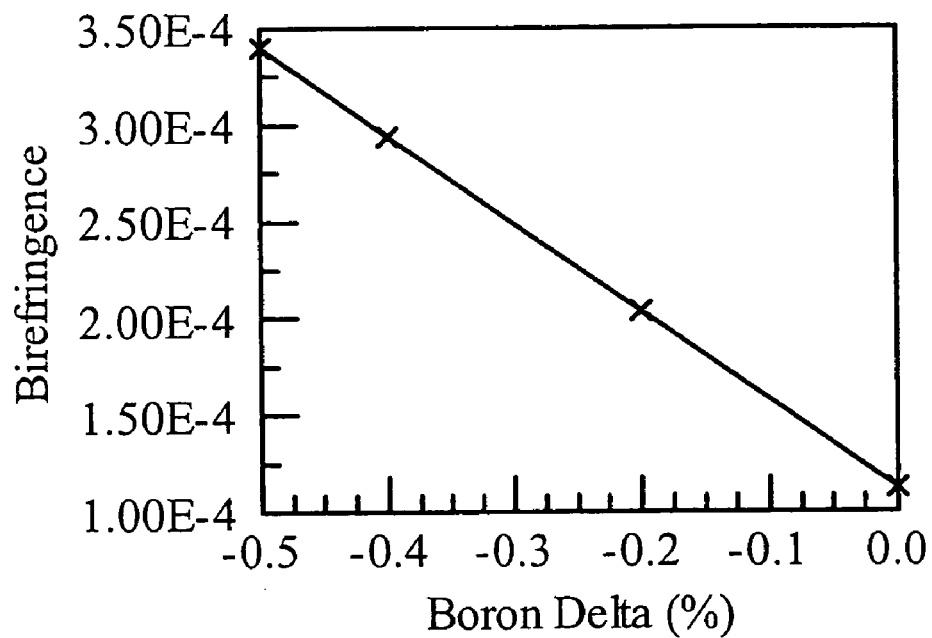
FIG. 5A illustrates the birefringence at 1550 nm as a function of Boron Delta of the stress rods.
Figure 5B:
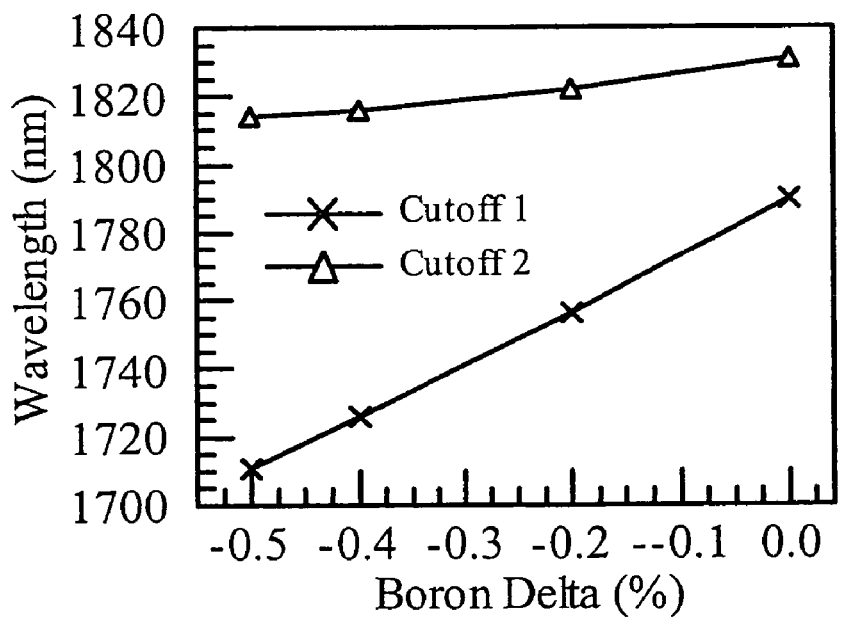
FIG. 5B illustrates the cutoff wavelengths of both polarization modes as a function of Boron Delta of the stress rods.

We also study the dependence of fiber birefringence level and the cutoff wavelengths of both polarization modes on the Boron doping level (at the stress rods) while keeping all other fiber parameters unchanged. FIG. 5A illustrates the dependence of the total birefringence on the Boron doping level. The constant (i.e., fixed) fiber parameters were: $\Delta_{core}$=0.35%, $R_{core}$=4.2 µm, $R_{rod}$=15 µm, $D_{rod}$=25 µm, fiber outer diameter (OD)=125 µm, and $R_{airhole}$=6 µm. Total birefringence increases essentially linearly with the Boron doping level (FIG. 5A). On the other hand, the cutoff wavelengths of both polarization modes are subtly affected. FIG. 5B illustrates the cutoff wavelengths of both polarization modes as a function of Boron Delta. The modeled fiber had the following constant (i.e., fixed) fiber parameters): $\Delta_{core}$ is 0.35%, $R_{core}$ is 4.2 µm, $R_{rod}$ is 15 µm, $D_{rod}$ is 25 µm, fiber outer diameter (OD) is 125 µm, and $R_{airhole}$ is 6 µm. FIG. 5B illustrates that while the polarization mode cutoff wavelength #2 (the longer cutoff wavelength) is basically flat, the cutoff wavelength #1 associated with another polarization mode moves closer to the cutoff wavelength #2 when Boron doping level is reduced, contributing to smaller birefringence. Thus higher birefringence yields higher single polarization bandwidth (SPB).

Figure 6:
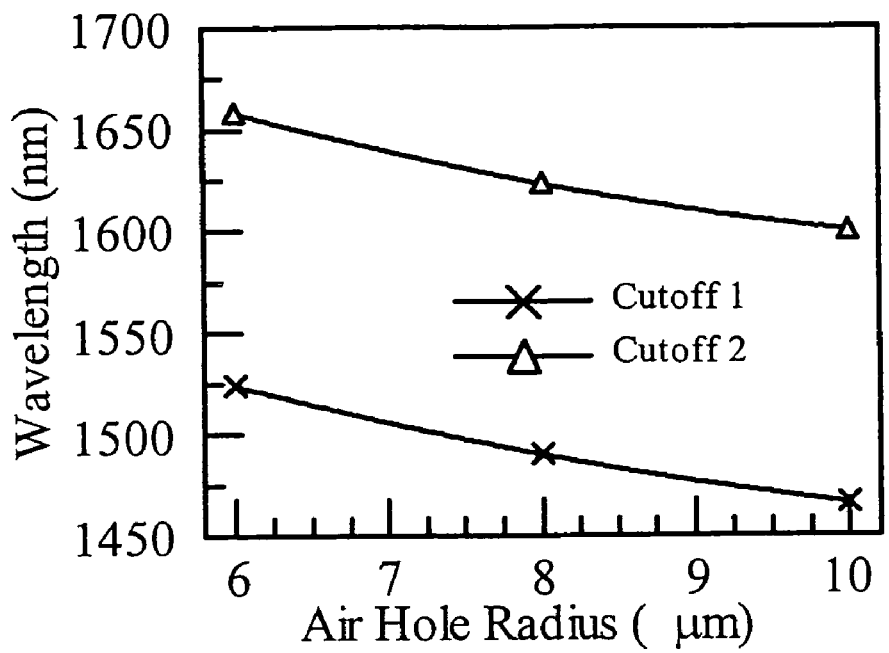
FIG. 6 illustrates the dependence of the cutoff wavelengths of both polarization modes on the air hole size.

The size of the air hole can also have effects on the performance of the optical fiber. In FIG. 6, we show the dependence of the cutoff wavelengths of both fundamental polarization modes on the air hole size. In this embodiment, the air holes 24, 26 are positioned right next to the core 12 and are in direct contact with the core. The size of the airholes 24, 26 was varied while other parameters are kept unchanged. The modeled fiber had the following constant (i.e., fixed) fiber parameters: $\Delta_{core}$=0.3%, $\Delta_{B2O3}$=−0.75%, $R_{core}$=4.2 µm, $R_{Rod}$=15 µm, $D_{Rod}$=25 µm, and fiber outer diameter (OD)=125 µm. FIG. 6 illustrates that as the air hole size increases, the cutoff wavelengths decrease, but the single polarization bandwidth (SPB) remains basically unchanged. Thus, the size of the air holes can be used as a fine tuning parameter to adjust the location of the cutoff wavelengths. However, the choice of the air hole size is also determined by the mechanical stability of the optical fiber during the drawing process. Typically the optimal air hole radius is above 5 microns, and more preferably between 5 microns and 10 microns.

Figure 7:
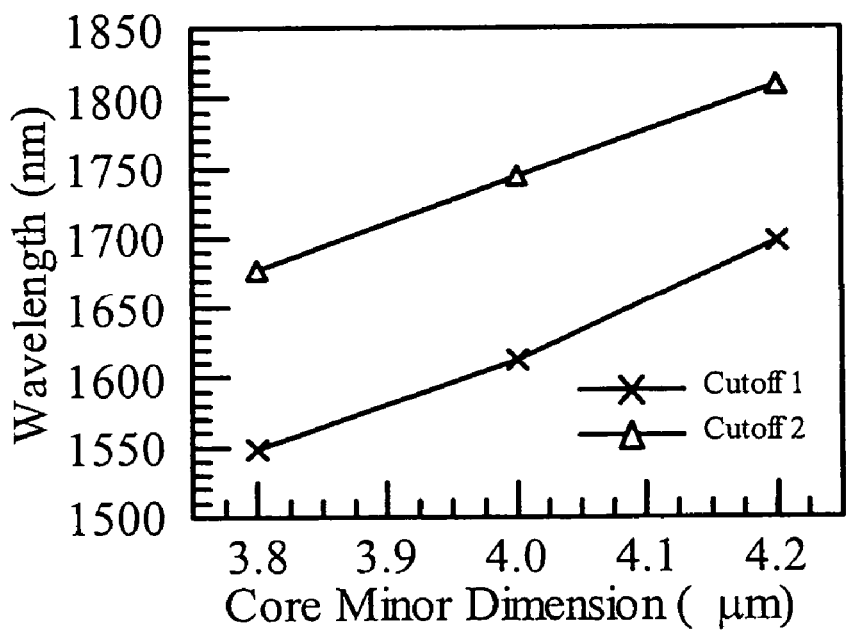
FIG. 7 illustrates the dependence of the fundamental cutoff wavelengths for both polarization modes on core minor dimension.

In many of the exemplary embodiments, we have chosen to have a circular core. However, the core can be elongated, for example elliptical. FIG. 7 illustrates the effect of minor core axis (dimension) on cutoff wavelength. Again, the air holes were positioned right next to the core with no separation. The modeled fiber had the following constant (i.e., fixed) fiber parameters): $\Delta_{core}$=0.3%, $\Delta_{B2O3}$=−0.75%, core length a=4.2 µm, $R_{Rod}$=15 µm, $D_{Rod}$=25 µm, and $R_{airhole}$=6 µm, fiber outside diameter is 125 µm. FIG. 7 illustrates that the cutoff wavelengths are sensitive to the changes in the minor core dimension (core width). This feature is quite useful as we can take advantage of it during the fiber drawing process. By controlling the air hole pressure during the fiber drawing process, the fiber core can be squeezed less or more, so that we can fine tune the location of the cutoff wavelength to provide the desired values.

Figure 8:
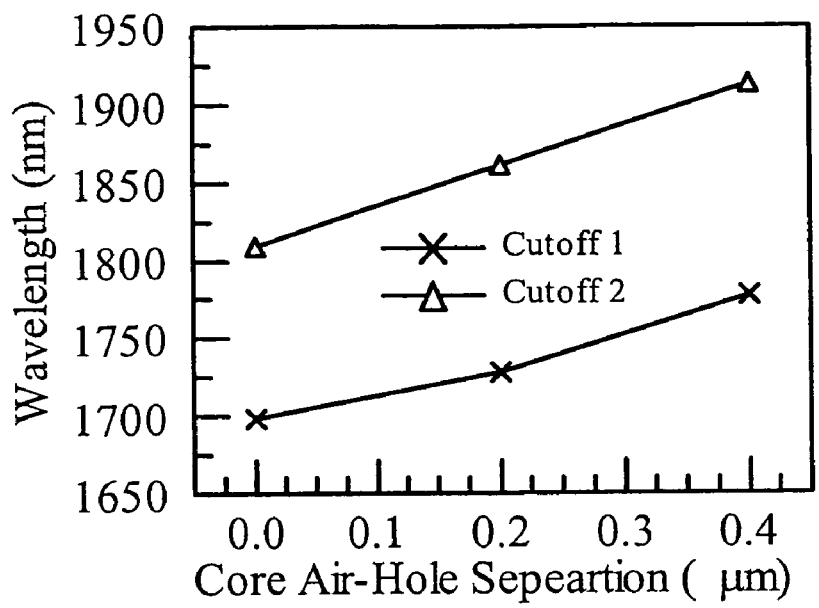
FIG. 8 illustrates the dependence of the fundamental cutoff wavelengths for both polarization modes on the separation between the core and the air holes.

We also studied the effect of the air hole location on the fiber properties. In all of above examples, the air holes are placed next to the core without separation. In this example (see FIG. 8) we varied the distance between the air hole centers and the center of the core 12. FIG. 8 illustrates the dependence of the cutoff wavelengths on the separation between the core 12 and the air holes 24, 26. We started by positioning the air holes 24, 26 directly adjacent to the core 12 and then increased distance between the core and the air holes. The modeled fiber had the following constant (i.e., fixed) fiber parameters: $\Delta_{core}$=0.3%, $\Delta_{B2O3}$=-0.75%, $R_{core}$=4.2 µm, $R_{Rod}$=15 µm, $D_{Rod}$=25 µm, and $R_{airhole}$=6 µm, fiber outside diameter is 125 µm. As the separation between the air holes 24, 26 increases, the cutoff wavelengths shift to higher values. The single polarization bandwidth also increases slightly.

Figure 9:
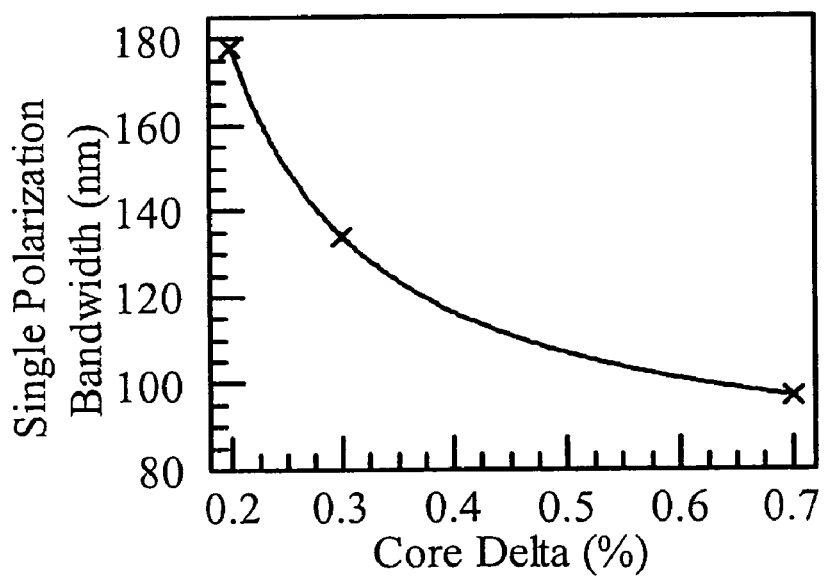
FIG. 9 illustrates the dependence of the single polarization bandwidth as a function of the core delta when core radius is adjusted to include 1550 nm for single polarization operation and air holes are right next to the circular core.

A single polarization fiber is typically designed to work at certain wavelength window, for example, a window centered around 1550 nm, 1310 nm, 1060 nm, or 850 nm. As shown before, adjustment to core radius, core delta, and boron delta can cause the change in the optical performance of the fiber. It is interesting to know when the center wavelength of the single polarization operating window is locked at the desired wavelength, how the single polarization operating bandwidth changes with the change in core delta. FIG. 9 illustrates the results of this study. The modeled fiber had the following constant (i.e., fixed) fiber parameters: rod delta $\Delta_{B2O3}$=-0.75%, $R_{airhole}$=6 µm, $R_{Rod}$=15 µm, and $D_{Rod}$=25 µm and fiber outside diameter is 125 µm. The single polarization operating window is centered at 1550 nm which is achieved by adjusting the core dimension to yield the right cutoff wavelength for fundamental mode. It can be found that the lower the core delta, the larger the single polarization bandwidth. In a practical situation, we need to keep a reasonable high core delta to make sure the fiber can have acceptable bending performance. Thus, preferably, an optimal range of core delta that can yield sufficiently large single polarization bandwidth and large enough mode field is between 0.10% and 0.5%.

Up to this point, we have investigated the properties of the dual air hole fibers with stress rods. With proper choice of the parameters, the proposed fiber can function either as a PM fiber at a wavelength below the shorter cutoff wavelength, or single polarization fiber at wavelength between the cutoff wavelengths of the polarization modes. When the fiber functions as PM fiber high birefringence in the order of $3 \times 10^{-4}$-$5 \times 10^{-4}$ can be achieved. The single polarization operation can be achieved in all typical wavelengths of interest such as 850 nm, 1060 nm, 1310 nm and 1550 nm. Some of the above modeled examples yield single polarization band of more than 100 nm, and some achieved the SPB of 180 nm. It is also noted that the number of stress rod or air holes can be one or multiple depending on the of specific performance requirements.

THE PROCESS FOR MAKING FIBER

The fibers of FIGS. 2A and 2B are produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making soot-preform. The soot-preform is then consolidated into solid glass in a high temperature furnace, after the bait rod is removed. The core and cladding compositions are achieved by utilizing different vapor-ingredients for each of the layers in the soot preform forming process. The soot core preform is generated first, then consolidated, followed by the cladding outside vapor deposition process and another consolidation step. The final preform is then drawn into single polarization optical fiber 10 by known fiber-drawing methods.

More specifically, the following steps are utilized to make the passive single polarization fiber and polarization maintaining fiber of FIGS. 2A and 2B.

1. Core cane formation. The core cane is formed first. The core is manufactured, for example, by a standard OVD process. The core materials are deposited onto the bait rod during the laydown step. The exemplary vapor-precursor-materials used to make the fiber core cane are $SiCl_4$, $GeCl_4$ and $O_2$.

Figure 10:
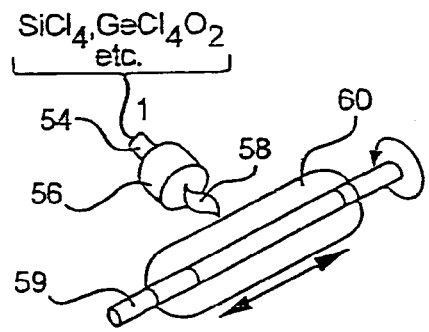
FIG. 10 is a schematic illustration of the formation of a core soot preform.

More specifically, according to one embodiment of the present invention, the, $SiCl_4$ and $GeCl_4$ are delivered to a gas burner 56. (See FIG. 10) The gas burner 56 generates a temperature of about 2000° C. The pre-determined amounts of various vapor-phase materials delivered for core (or clad) deposition stage are carried by oxygen provided to the burner 56, and react in the burner flame 58 where the desired glass-soot particles formed. The soot particles are then deposited onto a rotating bait-rod 59 through the thermopheretic mechanism to result in the designed soot-preform 62 which will be used to make core canes to manufacture single polarization fiber. If active fiber is desired, the core can be doped with an active dopant, for example, Yb or Er. Otherwise the resulting fiber will be a passive single polarization or polarization maintaining fiber.

Figure 11:
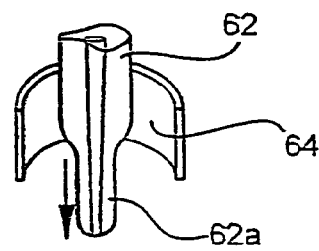
FIG. 11 illustrates consolidation of a core soot preform into a core glass preform.
Figure 12:
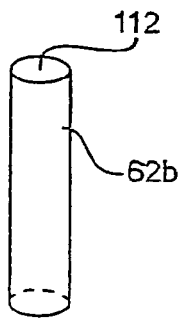
FIG. 12 illustrates schematically a core cane utilized to manufacture the fiber of FIG. 2A and FIG. 2B.

After the core soot preform is deposited, the soot preform 62 is cooled to room temperature and the bait rod 59 is removed from the center of core soot preform 62. The core soot preform 62 is then consolidated (densified into the solid glass) to become a solid glass-preform 62a which is drawn into core cane 62b. (See FIGS. 11 and 12.)

The core soot preform 62 has sufficient amount of Ge to produce, after the cladding process is completed, a fiber with core delta of 0.1~to 1.0%. A different core delta can be achieved with a different amount of Ge level. After the core preform 62a has been consolidated, as described above, it is drawn into the core cane 62b. The core cane 62b is preferably 1 meter long and about 8 mm in diameter. The core cane 62b is illustrated schematically in FIG. 12.

Figure 13:
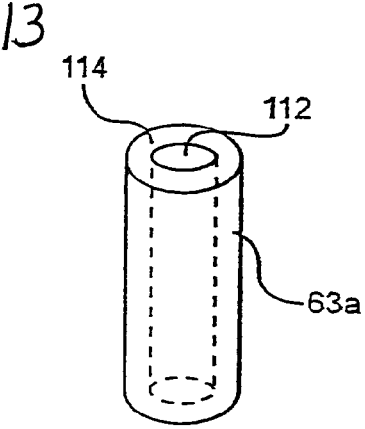
FIG. 13 illustrates schematically a core-clad cane utilized to manufacture the fiber of FIG. 2A and FIG. 2B.

2. First clad blank formation. The core cane 62b is overclad with silica soot to form a core/clad (soot) blank. This core/clad (soot) blank is then consolidated to form cane 63a. This blank 63a has a core to clad diameter ratio of 0.4 to 0.6. The cane 63a is about 42 mm in diameter. Cane 63a is illustrated schematically in FIG. 13.

Alternatively a sleeving process may be utilized to form cane 63a, by placing a silica sleeve around the core cane 62b.

3. Stress-rods fabrication. Additionally, a soot-preform containing the desired amount of B, P, F or Ge for stress generation can be made in a similar manner by OVD with the use of the respective vapor ingredient. The soot preform is subsequently consolidated, and is redrawn into a solid rod as the stress-applying part 13, 15.

Figure 14:
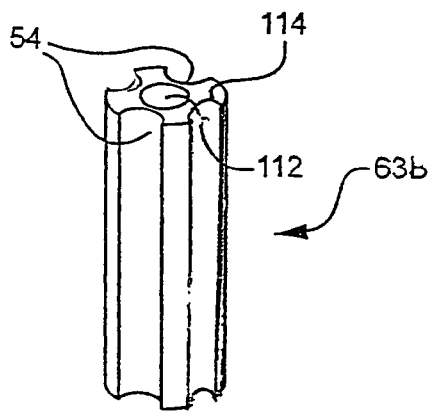
FIG. 14 illustrates schematically a grooved cane utilized to manufacture the fiber of FIG. 2A and FIG. 2B.

4. Grooved cane formation. The cane 63a includes sections 112, 114, which correspond to the core 12 and the cladding layer 14 (shown in FIG. 2A and FIG. 2B) of the optical fiber 10, is preferably about 1 meter long and about 8 mm in diameter. The four grooves 54 are then ground into two diametrically opposite longitudinal sides of the cane 63a, for example to a width of about 6.4 mm and to a depth of about 8 to 10 mm, thereby forming grooved cane 63b. (See FIG. 14.) The groove depth depends on the thickness of the first clad layer, but should be such that its bottom substantially abuts the section 112 (corresponding to the fiber core 12), as illustrated in FIG. 14. The grooved cane 63b is HF etched for about 30 minutes to clean any grinding residue and then redrawn to an appropriate size cane (OD of about 8 mm).

Figure 15:
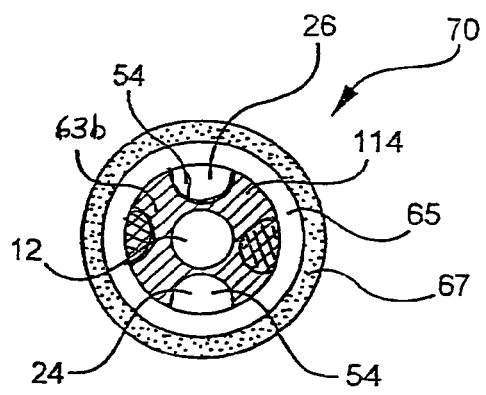
FIG. 15 illustrates schematically a glass tube with the inserted grooved cane of FIG. 14.

The grooved and redrawn cane 63b with a pair of the stress-rods attached and inserted in one set of diametrically positioned grooves, is then inserted into a 1 meter long silica tube or sleeve 65 overclad with silica soot 67 (for example, about 800-1000 gms.), as shown in FIG. 15, to form a preform subassembly 70. Silica overcladding 67 method on the sleeve 65 is preferably produced by an Outside Vapor Deposition (OVD). The exemplary silica tube 65 may have an inner diameter of about 8.8 mm and an outer diameter of about 11.8 mm which supports a layer of silica soot 67. The silica tube baring soot is cleaned, both inside and outside, with a chemical solvent or alcohol (IPA for example), prior to the insertion of the etched and re-drawn cane 63*b* into the tube 65. If needed, the two holes 24, 26 in the preform subassembly 70 may be further etched via HF to enlarge the holes.

Figure 16:
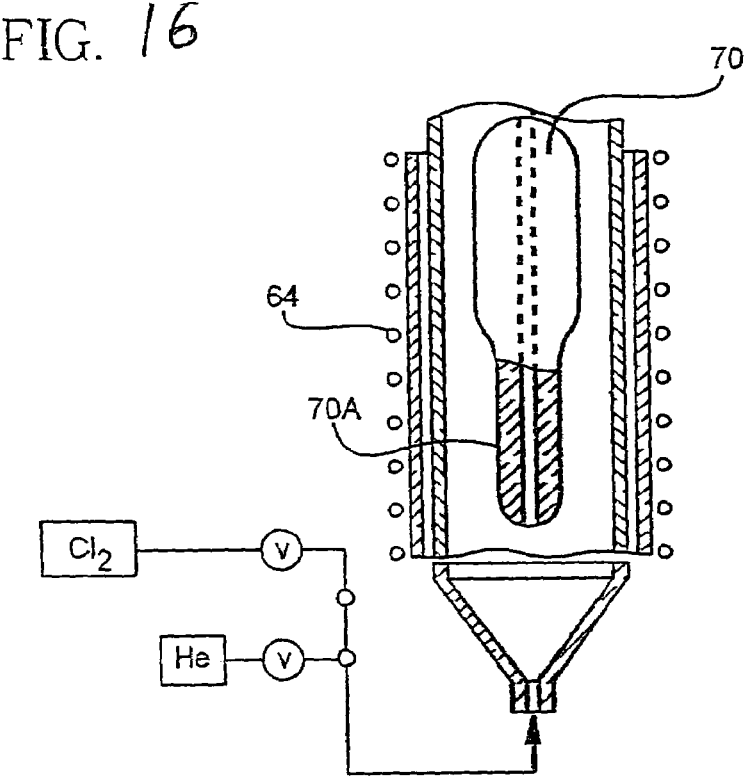
FIG. 16 illustrates schematically an exemplary consolidation process utilized to manufacture the fiber of FIGS. 2A and 2B.
Figure 17:
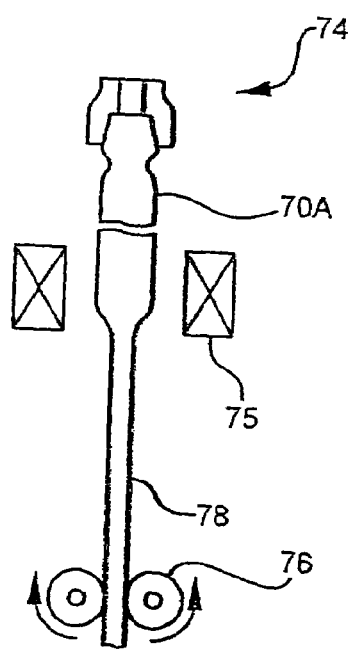
FIG. 17 illustrates schematically a redraw tower utilized to manufacture the fiber of FIGS. 2A and 2B.
Figure 18:
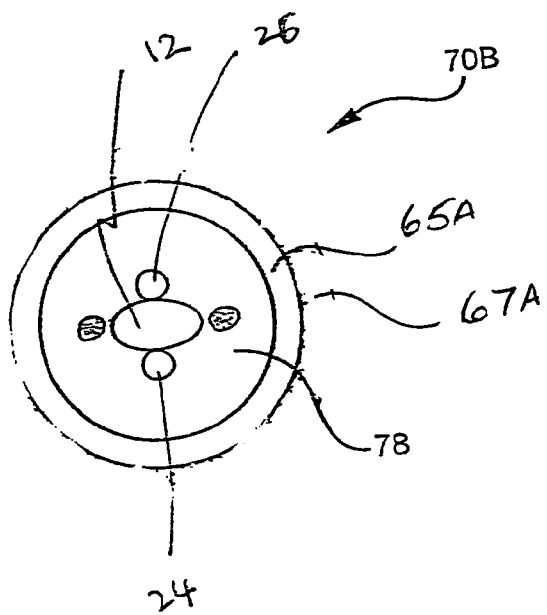
FIG. 18 illustrates schematically a preform assembly that includes core cane with air holes and stress rods, and a silica tube overclad with silica soot.

The preform subassembly 70 of FIG. 15 is then consolidated in accordance with a conventional consolidation process as shown in FIG. 16 by first drying in a consolidation furnace 64 in an atmosphere of $Cl_2$, and then consolidating in the furnace in a He-containing atmosphere to produce a consolidated preform 70A. The consolidated preform 70A is then inserted into a redraw tower 74 as shown in FIG. 17. The preferred down feeding rate is about 7 mm/min. Heat is applied to preform 70A by heating element 75 and it is drawn down by tension applying wheels 76 into an approximately 5-8 mm diameter cane 78. While the redraw process (drawing to a smaller diameter core cane from the preform) is occurring, a positive pressure (about 1 psi) is applied to the holes 24, 26 sufficient to keep them from closing. The pressure may be sufficient to cause the central core to elongate slightly. The pressure used is a function of the draw temperature, glass viscosity, and draw speed among other factors. This cane 78, now having a circular or an elliptically shaped central core 12 and air holes 24 and 26 is again inserted into a 1 meter long silica tube 65A which is overclad with about 1000 grams of silica soot 67A, as shown in FIG. 18 to form preform subassembly 70B. This preform subassembly 70B is consolidated in the same manner as heretofore to form consolidated blanks 71 (see FIG. 19).

Figure 19:
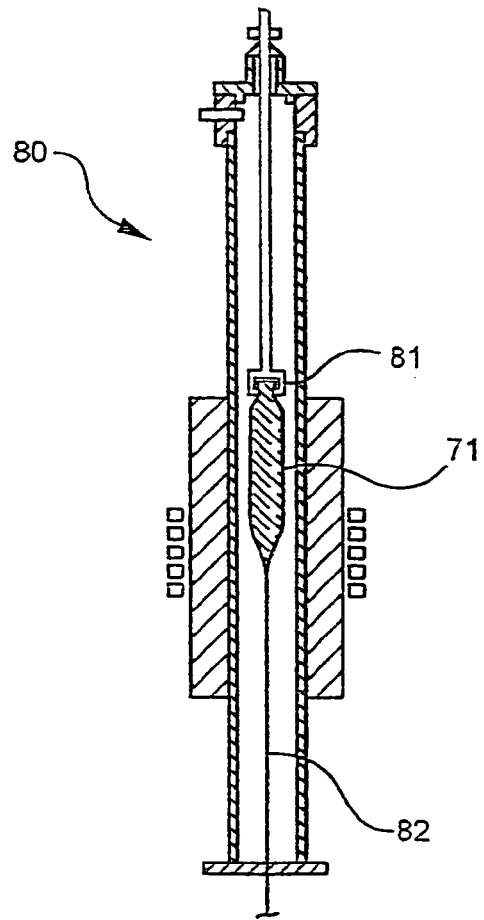
FIG. 19 illustrates schematically a process for drawing fiber utilized to manufacture the fiber of FIGS. 2A and 2B.

The consolidated blank 71 is then suspended from a handle 81 in a draw tower 80 as shown in FIG. 19 and a fiber 82 is drawn therefrom. During draw, a small positive pressure (about 1 psi or less) is applied to the holes to keep them from closing. This may cause the core to become (more) elliptically shaped. In the exemplary fiber depicted in FIGS. 2A and 2B, we utilize positive pressure of less than 0.1 psi. The draw speed is about 1 m/sec. The resulting fiber has an elliptically shaped core and, dual stress rods and dual air holes.

As should be recognized, the elongation of the core may occur in the redraw step, the draw step, or combinations thereof to achieve the desired aspect ratio of the central core. In either case, a positive pressure is applied to the holes in the preform (and fiber) to cause the elongation to occur.

It will be apparent to those skilled in the art that variations and modifications can be made to the present invention without departing from the scope of the invention. For example, although step index structures are show, other graded index structures may be employed. Moreover a ring structure may be added to the fiber profile as well and would still function acceptably. Thus, it is intended that the present invention cover the modifications and variations of this invention provided they come within the scope of the appended claims and their equivalents.

What is claimed is:

1. An optical fiber comprising:
   (i). a silica based passive core having a first index of refraction $n_1$;
   (ii). a silica based cladding surrounding the core and having a second index of refraction $n_2$, such that $n_1 > n_2$, said cladding having having a plurality of stress rods and a plurality of air holes extending longitudinally through the length of said optical fiber, and all air holes in said silica based cladding being situated substantially the same distance from said core;
   (iii) wherein said optical fiber supports a single polarization mode in a wavelength range below 1900 microns, and wherein said air holes are situated less than 0.4 µm away from said core.

2. The optical fiber according to claim 1 wherein said core is a circular core.

3. The optical fiber according to claim 1 wherein said core is elliptical and the ratio of its maximum dimension to its minimum dimension is at least 1:1.5.

4. The optical fiber according to claim 1 wherein said air holes are circular with a diameter of 4 µm to 40 µm.

5. The optical fiber according to claim 1 wherein said air holes are circular with a diameter of 10 µm to 20 µm.

6. The optical fiber according to claim 1 wherein said cladding contains an even number of air holes.

7. The optical fiber according to claim 1 wherein said cladding contains an even number of stress rods.

8. The optical fiber according to claim 1 wherein said stress rods are doped with at least one of: $B_2O_3$ and $P_2O_5$.

9. The optical fiber according to claim 1 wherein said stress rods have a circular cross-section and have radius of 5 µm to 50 µm.

10. The optical fiber according to claim 1 wherein the core delta is 1% Δ or less.

11. The optical fiber according to claim 1 wherein the core delta is 0.5% Δ or less.

12. The optical fiber according to claim 1 wherein the core delta is 0.2% to 0.5%.

13. The optical fiber according to claim 1 wherein said operating wavelength range is 1000 nm to 1120 nm, or 1520 nm to 1580 nm.

14. An optical fiber comprising:
   (i). a silica based passive core having a first index of refraction $n_1$;
   (ii). a silica based cladding surrounding the core and having a second index of refraction $n_2$, such that $n_1 > n_2$, said cladding having at least one stress rod and a plurality of air holes extending longitudinally through the length of said optical fiber, and all air holes in said silica based cladding being situated substantially the same distance from said core;
   (iii) wherein said optical fiber supports a single polarization mode in a wavelength range or poses polarization maintaining properties within another operating wavelength range, wherein said silica based cladding includes a moat surrounding and in physical contact with said core, said moat having an index of refraction smaller than that of said core and smaller than that of said cladding.

15. An optical fiber comprising:
   (i). a silica based Ge doped passive core having a first index of refraction $n_1$;
   (ii). a silica based cladding surrounding the core and having a second index of refraction $n_2$, such that $n_1 > n_2$, said cladding having at least one stress rod and at least one air hole extending longitudinally through the length of said optical fiber, wherein the diameter of said at least one air hole is 10 µm to 40 µm;
   (iii) wherein said optical fiber supports a single polarization mode in a wavelength range and poses polarization maintaining properties within another operating wavelength range, and said air holes are situated no more than 0.4 µm away from said core.

16. The optical fiber according to claim 15 wherein said cladding contains an even number of air holes.

17. The optical fiber according to claim 15 wherein said cladding contains an even number of stress rods.

18. The optical fiber according to claim 15 wherein said stress rods are doped with at least one of: $B_2O_3$ and $P_2O_5$.

19. An optical fiber comprising:
   (i). a silica based passive core having a first index of refraction $n_1$;
   (ii). a silica based cladding surrounding the core and having a second index of refraction $n_2$, such that $n_1 > n_2$, said cladding having (a) at least one stress rod, and (b) only two air holes extending longitudinally through the length of said optical fiber, the two air holes being situated substantially the same distance from said core, wherein said distance is less than 0.4 µm;
   (iii) wherein said optical fiber supports a single polarization mode in a wavelength range below 1900 microns.

* * * * *